United States Patent
Masaki et al.

[15] 3,687,938
[45] Aug. 29, 1972

[54] PROCESS FOR THE PREPARATION OF LACTAM-LEWIS ACID COMPLEX

[72] Inventors: Mitsuo Masaki, Kiyoshi Fukui, Mashiro Ueda, Kiyomi Okimoto all of Chiba-ken Japan

[73] Assignee: UBE Industries, Ltd., Ube-shi, Japan

[22] Filed: Aug. 31, 1970

[21] Appl. No.: 68,517

[52] U.S. Cl......260/239.3 R, 260/239.3 A, 260/293.86, 260/326.5 FN, 260/270, 260/299
[51] Int. Cl. ............................................C07d 41/06
[58] Field of Search ...260/293.3 A, 293.3 R, 293.86, 260/326.5 FN

[56] References Cited

UNITED STATES PATENTS 3,090,739  5/1963  Ito ......................260/239.3 A 3,114,748  12/1963  Bigot et al...........260/239.3 A

OTHER PUBLICATIONS

Organic Reactions Vol. 11 pages 2– 14 (Wiley) (1960)

Primary Examiner—Henry R. Jiles
Assistant Examiner—Robert T. Bond
Attorney—Sherman and Shalloway

[57] ABSTRACT

A process for the preparation of lactams, which comprises reacting lactim-O-sulfonic acid with a complex of alicyclic ketoxime with a halide which is a Lewis acid, and recovering the complex of lactam with the halide.

4 Claims, No Drawings

PROCESS FOR THE PREPARATION OF LACTAM-LEWIS ACID COMPLEX

This invention relates to a process for the preparation of lactam-Lewis acid complexes. More particularly, the present invention relates to a novel process comprising reacting lactim-O-sulfonic acid with a complex of alicyclic ketoxime with a halide which is a Lewis acid, and thereby forming a complex of lactam with said halide.

The lactim-O-sulfonic acid employed in the present invention can be represented by the formula:

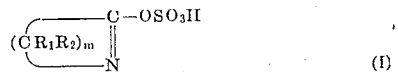

(I)

in which
  $m$ is a number of 3 to 11, and each of $R_1$ and $R_2$ is hydrogen atom, an alkyl or alkenyl group.

Such lactim-O-sulfonic acids wherein the radicals $R_1$ and $R_2$, referring to the above formula (I), are hydrogen atoms are preferred for the purpose of this invention. Specific examples include, for instance, butyrolactim-O-sulfonic acid, valerolactim-O-sulfonic acid, caprolactim-O-sulfonic acid, enantholactim-O-sulfonic acid, caprylolactim-O-sulfonic acid, pelargonolactim-O-sulfonic acid, caprilactim-O-sulfonic acid, undecanolactim-O-sulfonic acid, and laurolactim-O-sulfonic acid. Also such lactim-O-sulfonic acids wherein either one or both of the radicals $R_1$ and $R_2$ are alkyl group (s), preferably alkyl groups of up to four carbons such as methyl, ethyl, or propyl; or alkenyl groups, preferably alkenyl groups of two to four carbons such as vinyl or allyl, can be used in this invention. Specific examples include, for instance, γ-methylcaprolactim-O-sulfonic acid, γ-ethylcaprolactim-O-sulfonic acid, β-propylvalerolactim-O-sulfonic acid, γ-propylvalerolactim-O-sulfonic acid, γ-vinylcaprolactim-O-sulfonic acid, and γ-allylcaprolactim-O-sulfonic acid.

As the complexes of alicyclic ketoximes with halides which are Lewis acids, those of the ketoximes represented by the formula,

(II)

in which
  $n$ is a number of 3 to 11, and $R_1$ and $R_2$ are as defined above,
with the halides which are Lewis acids can be used.

The halides which are Lewis acids are known per se, and include various types. Whereas, useful halides for the present invention are those represented by the general formula below:

$$MX_p \qquad (II')$$

in which M is an element of Group I B of periodic table, e.g., copper; that of Group II B, e.g., zinc; that of Group III A, e.g., boron and aluminum; that of Group IV A, e.g., tin, that of Group IV B, e.g., zirconium; that of Group V A, e.g., antimony; or that of Group VIII, e.g., nickel and iron: X is a halogen atom such as fluorine, bromine, or chlorine: and $p$ is a number equalling the valency of M.

Incidentally, the periodic table herein referred to is that of Werner-Pfeifer.

Preferred halides for the present invention are, by the order of their importance, stannic chloride, stannic bromide, zirconium tetrachloride, zinc chloride, boron trifluoride, antimony pentachloride, boron trichloride, and aluminum trichloride.

As the alicyclic ketoximes, those in which the radicals $R_1$ and $R_2$, referring to the foregoing formula (II), are both hydrogen atoms are preferred. Specific examples of such ketoximes include: cyclobutanone oxime, cyclopentanone oxime, cyclohexanone oxime, cycloheptanone oxime, cyclooctanone oxime, cyclononanone oxime, cyclodecanone oxime, cycloundecanone oxime, and cyclododecanone oxime, etc.

On the other hand, those ketoximes in which either one or both of the radicals $R_1$ and $R_2$ are an alkyl group, preferably an alkyl group of up to four carbon atoms such as methyl, ethyl, propyl; or an alkenyl group of preferably two to four carbon atoms such as vinyl and allyl, can also be used. Examples of such ketoximes include 4-methylcyclohexanone oxime, 4-ethylcyclohexanone oxime, 3-propylcyclopentanone oxime, 4vinylcyclohexanone oxime, and 4-allylcyclohexanone oxime, etc.

The complexes of those preferred alicyclic ketoximes with halides can be generally represented by the formula:

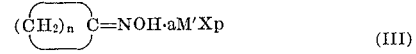

(III)

in which
  $n$ is a number of 3 to 11, M' is tin, zirconium, boron, zinc, antimony or aluminium; X is a halogen atom, $p$ is a number equalling valency of M', and $a$ is ½ or 1.

It has been discovered, according to the present invention, that the lactim-O-sulfonic acids readily react with the complexes of alicyclic ketoximes with the halides, and are converted to complexes of the lactams with halides. Simultaneously, the alicyclic ketoximes are sulfonated to form alicyclic ketoxime-O-sulfonic acids. Under normal conditions, the alicyclic ketoxime-O-sulfonic acids are immediately rearranged to lactim-O-sulfonic acids, for repetitive use in the foregoing reaction.

Namely, the novel reaction as described above can be generally represented by the reaction formula below:

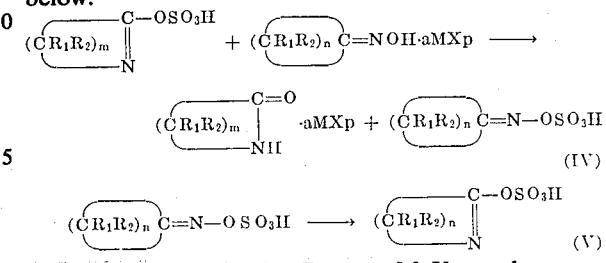

in the above formulae, $R_1$, $R_2$, $m$, $n$, M, X, $a$ and $p$ are as defined above.

It is recommended that this novel reaction should be performed under substantially anhydrous condition and in the presence of an inert, organic solvent. Suitable examples of usable inert solvent include halogenated hydrocarbons such as methylene chloride, ethylene chloride, ethylene bromide, chloroform and carbon tetrachloride; and hydrocarbons such as toluene, xylenes, benzene and cyclohexane. Of course, the solvent is not limited to the above-named, but other inert organic solvents can be used so long as they are inert particularly to lactim-O-sulfonic acid.

The most important feature of the reaction is an intimate contact of lactim-O-sulfonic acids with the complexes of alicyclic ketoximes with the halides. As long as the two are satisfactorily contacted, the reaction proceeds quantitatively.

In the reaction of formula (IV) of this invention, the alkylene radical, $(CR_1R_2)_m$, of lactim-O-sulfonic acid and the alkylene radical, $(CR_1R_2)_n$, of ketoxime complex may be identical or different.

The reaction temperature is not critical, while normally the temperatures within the range at which no decomposition of the lactim-O-sulfonic acid takes place, i.e., $-30°$ – $150°$ C., preferably $-10°$ – approximately $100°$ C., are suitably employed. At temperatures outside the said range, there is a tendency to retard the progress of reaction, or objectionable side-reactions are induced.

The pressure may be atmospheric or elevated to achieve satisfactory results. Elevated pressure show no conspicuous advantage over atmospheric pressure.

The mole ratio of the reactants, i.e., the complex of alicyclic ketoxime with the halide, to lactim-O-sulfonic acid, can be varied over a wide range. For example, it may be selected from such a wide range of 1 : 0.01 to 1 : 100. However, in order to inhibit side-reactions and to raise the efficiency of the intended reaction, it is particularly advantageous to adjust the quantity of complex of alicyclic ketoxime with the halide in the reaction system to less than 500 mol percent, particularly less than 100 mol percent, per the lactim-O-sulfonic acid.

According to the invention, the complex compounds of lactams of the formula,

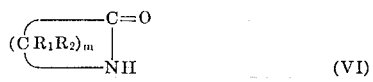

in which $R_1$, $R_2$, and $m$ are as defined above,
with the halides are obtained according to the above formula (IV).

In this reaction, ketoxime-O-sulfonic acid of the formula,

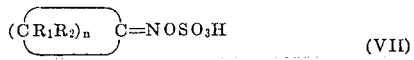

in which $R_1$, $R_2$, and $n$ are as defined above
are produced as by-products.

This ketoxime-O-sulfonic acid can be isolated when relatively low reaction temperatures such as $10°$ C. or below are employed. However, when temperatures not lower than room temperature ($20°$ C.) are employed for the reaction, generally the formed ketoxime-O-sulfonic acid is easily rearranged to lactim-O-sulfonic acid in the reaction system, with minor variations depending on the type of halide.

When not less than equimolar quantity of lactam is concurrently present together with the alicyclic ketoxime-O-sulfonic acid, it is normally impossible to rearrange the alicyclic ketoxime-O-sulfonic acids to the lactim-O-sulfonic acids. Surprisingly, however, we discovered that when the formed lactam is present in the system as a complex with the halide which is a Lewis acid, the alicyclic ketoxime-O-sulfonic acid is easily rearranged to lactim-O-sulfonic acid [the above reaction (V)], independently of the quantity of the lactam complex, and the lactim-O-sulfonic acid can again participate in its reaction with the complex of alicyclic ketoxime and halide.

Therefore, when lactim-O-sulfonic acid is allowed to react with the complex of alicyclic ketoxime with halide normally at temperatures ranging from room temperature ($20°$ C.) to $100°$ C., although slightly differing depending on the type of halide which is Lewis acid employed, substantially all the alicyclic ketoxime complex can be rearranged into the lactam complex. In that case, it is advantageous to control the quantity of alicyclic ketoxime complex present in the reaction system always to less than 500 mol percent, particularly less than 100 mol percent, to the lactim-O-sulfonic acid, by adding the alicyclic ketoxime complex portionwise, incrementally or continuously, when a large excess of the complex to the lactim-O-sulfonic acid is used.

Also it is advantageous to promote the rearrangement of formed alicyclic ketoxime-O-sulfonic acid to lactim-O-sulfonic acid. For this purpose, a halide which is a Lewis acid, for example, that represented by the formula (II'), may be added to the reaction system, optionally in the form of a complex with an ether, in a quantity not exceeding the amount equimolar to the lactim-O-sulfonic acid initially present in the system.

As the ethers to form complexes with the halides, those of the formula,

in which

R is an alkyl or phenyl group of up to 10 carbon atoms, $R_4$ is an alkylene or phenylene of two to four carbons, $q$ is zero or an integer of 1 – 3, and $R_5$ is an alkyl group of up to 10 carbon atoms,
are suitable.

Specific examples of useful ethers include monoethers such as diethyl ether, dipropyl ether, etc.; diethers such as ethylene glycol dimethyl ether, ethylene glycol diethyl ether, etc.; triethers such as diethylene glycol dimethyl ether, diethylene glycol diethyl ether; and ethers containing aromatic hydrocarbon radicals such as anisol. Of course, ethers other than the above-named may be used, so long as the complexes that they form with the halides are soluble in the solvent employed in the reaction of lactim-O-sulfonic acid with the alicyclic ketoxime complex. When the ether-halide complex is sparingly soluble in the solvent, the reaction system becomes heterogeneous, and furthermore the complex precipitates together with the formed lactam complex, so that its addition becomes meaningless.

According to the invention, the lactam-halide complex as formed is separated from the reaction mixture as the solid component, by the means known per se. For example, alicyclic ketoxime-stannic halide complex is solid, and sparingly soluble in an inert organic solvent such as recited above, but the complex is progressively dissolved as its reaction with lactim-O-sulfonic acid advances. Thereafter solid lactam-stannic halide complex is precipitated. Therefore, the solid lactam-stannic halide complex as precipitated is recovered when the reaction of the added alicyclic ketoxime-stannic halide complex is completed. When the formed lactam complex is soluble in the inert, organic solvent, the recovery of the lactam complex may be performed by throwing the reaction mixture into a solvent in which the lactam complex is insoluble and thereby precipitating it.

The complexes of lactams with halides which are Lewis acids can be decomposed into free lactams and complexes of the halides with strongly basic substances, upon treating them with the strongly basic substances such as ammonia and amine, following known practice.

The complexes of alicyclic ketoximes with the halides which are Lewis acids have never been disclosed in the literature published to date, but they can be readily obtained by contacting the ketoximes of formula (II) as already described, with the halides which are Lewis acids as already explained, preferably at liquid phase. Examples of suitable solvent include halogenated hydrocarbons such as methylene chloride, ethylene chloride, ethylene bromide, chloroform and carbon tetrachloride; and ethers such as ethylene ether, isopropyl ether, dioxane and tetrahydrofuran. Of course, solvents other than the above-named may be used.

What is critical is the sufficient contact of the ketoximes with the halides which are Lewis acids. When the two are satisfactorily contacted, the reaction proceeds quantitatively, with ease and at high speed. That is, the reaction temperature and time are not critical. Because the reaction is temporarily exothermic, the system is preferably cooled to below room temperature during progress of the reaction. The quantity of the halide required is at least stoichiometric to the ketoxime, while the object product could be formed with less quantity of the halide.

Among the solvents named in the foregoing, the ketoxime-halide complexes are in most cases precipitated, and therefore can be easily recovered. When all or part of the complex is dissolved in the solvent, first the solvent is removed, and thereafter the complex may be recovered by extraction with suitable solvent, utilizing the difference in solubility of (1) the complex and the halide employed, or (2) that of the complex, ketoxime, and halide employed.

The lactim-O-sulfonic acid of the foregoing formula (I) can be formed by the means known per se, for example, by reacting lactam with sulfur trioxide, or reacting oxime with sulfur trioxide-Lewis base addition product, followed by thermal rearrangement of the resulting oxime-O-sulfonic acid.

However, when lactim-O-sulfonic acid is used in the reaction in the concurrent presence of halide, it can also be obtained by treating a lactam-halide complex with sulfur trioxide, or by directly treating the complex of corresponding alicyclic ketoxime with halide with sulfur trioxide. This latter reaction can be represented by the formula below:

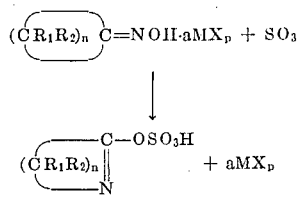

The following examples are illustrative of the present invention. It will be understood that the invention is not limited to those examples.

Examples 1 through 9 concern the preparation of alicyclic ketoximes with the halides which are Lewis acids.

EXAMPLE 1

To a solution of 9.9 g (100 m moles) of cyclopentanone oxime in 50 ml of ethylene chloride, a solution of 13.0 g (50 m moles) of stannic chloride in 20 ml of ethylene chloride was slowly added with stirring. During the reaction, the mixture was externally cooled to be maintained at temperatures not higher than 10° C. After the addition, the mixture was allowed to be gradually warmed up to room temperature, with continuous stirring. The resulting colorless, transparent liquid reaction mixture was concentrated under reduced pressure. To the syrup-like concentrate, 50 ml of ethyl acetate were added, followed by standing to allow precipitation of said component. Upon filtration of the mixture, 20.1 g of colorless precipitate were obtained. The elemental analytical values of the precipitate were as follows: N: 6.02 %, C: 26.23 %, and H: 3.97 %, and melting pint was 169° – 170° C. The values corresponded well to the theoretical values of cyclopentanone oxime-stannic chloride complex in a mole ratio of 2 : 1 ($C_{10}H_{18}N_2O_2 \cdot SnCl_4$), which are N: 6.10 %, C: 26.16 %, and H: 3.92 %. The yield was 89 %.

EXAMPLE 2

To a solution of 11.3 g (100 m moles) of cyclohexanone oxime in 50 ml of ethylene chloride, a solution of 13.0 g (50 m moles) of stannic chloride in 20 ml of ethylene chloride was slowly added with stirring. During the reaction the mixture was externally cooled to the temperatures not higher than 10° C. Soon after completion of the addition, colorless precipitate began to form. After standing overnight, the precipitate was filtered, which weighed 23.7 g. The elemental analytical values of the precipitation product were as follows: N: 5.93 %, C: 29.60 %, and H: 4.47 %. The melting point was 190.5° – 191° C. The analytical values corresponded well with the calculated values of the complex of cyclohexanone oxime and stannic chloride in a mole ratio of 2 : 1 ($C_{12}H_{22}N_2O_2 \cdot SnCl_4$), which are N: 5.75 %, C: 29.57 %, and H: 4.52 %. The yield was 97 %.

EXAMPLE 3

38.1 grams of 4-methylcyclohexanone oxime (300 m moles) and 39.2 g of stannic chloride (150 m moles) were allowed to react similarly to Example 2, producing 65.7 g of a colorless precipitate. The elemental analytical values of the precipitate were as follows: N: 5.46 %, C: 32.81 %, and H: 4.93 %. The melting point was 161° – 163°C. The analytical values corresponded well to the calculated values of 4-methylcyclohexanone oxime-stannic chloride complex in a mole ratio of 2 : 1

($C_{14}H_{262}O_2 \cdot SnCl_4$), which are N: 5.45 %, C: 32.68 %, and H: 5.06%. The yield was 85 percent.

EXAMPLE 4

9.85 grams of cyclododecanone oxime (50 m moles) and 6.5 g of stannic chloride (25 m moles) were allowed to react similarly to Example 1, and the reaction mixture was treated in a manner similar to that of Example 1 to yield 11.7 g of a colorless precipitate. The elemental analytical values of the precipitate were as follows: N: 4.29 %, C: 43.71 %, and H: 6.99 %. The melting point was 144.5° – 145.5° C. The analytical values corresponded well to the calculated values of cyclodecanone omine-stannic chloride complex in a mole ratio of 2 : 1 ($C_{24}H_{46}N_2O_2 \cdot SnCl_4$), which are N: 4.28 %, C: 44.00 %, and H: 7.03 %. The yield was 72 percent.

EXAMPLE 5

To a solution of 34 g (300 m moles) of cyclohexanone oxime in 100 ml of an ethylene chloride, a solution of 65.7 g (150 m moles) of stannic bromide in 60 ml of ethylene chloride was added dropwise, under external cooling with water. In the meantime, the temperature of the mixture rose from 20° to 32° C. After completion of the addition, the stirring was continued at room temperature. The solution began to become turbid after 30 minutes, and after 2 hours and a half the whole mixture appeared to be solidified, and crystalline precipitate was formed.

To said mixture, 100 ml of ethylene chloride were added, and the mixture was filtered. Whereby 95.3 g of cyclohexanone oxime-stannic bromide complex were obtained, which had a melting point of 190° – 190.5° C., and elemental analytical values were as follows: C: 21.70 %, H: 3.17 %, N: 4.18 % and Br: 48.11 %. The values corresponded well to the calculated values of cyclohexanone oxime-stannic bromide complex in a mole ratio of 2 : 1 ($C_{12}H_{22}N_2O_2 \cdot SnBr_4$), which are C: 21.67 %, H: 3.31 %, N: 4.21 %, and Br: 48.11 %. The yield was 96 percent.

EXAMPLE 6

To a solution of 10.90 g (96 m moles) of cyclohexanone oxime in 20 ml of ethylene chloride, a solution of 28.7 g (96 m moles) of antimony pentachloride in 20 ml of ethylene chloride was added dropwise, at a temperature below 0° C., with stirring. Thereafter the mixture was stirred for 3 hours at room temperature, and the formed precipitate was filtered to give 28.9 g of cyclohexanone oxime-antimony pentachloride complex having a melting point of 138°–141° C. Elemental analytical values of the product were as follows: C: 17.48 %, H: 2.69 %, N: 3.39 %, and Cl: 43.22 %, which corresponded well to the calculated values of cyclohexanone oxime-antimony pentachloride complex in a mole ratio of 1 : 1 ($H_6H_{11}NO \cdot SbCl_5$), i.e., C: 17.63 %, H: 2.81 %, N: 36.0 %, and Cl: 34.10 %. The yield was 73 percent.

EXAMPLE 7

To a solution of 34 g (300 m moles) of cyclohexanone oxime in 50 ml of ethyl acetate, a solution of 21 g (150 m moles) of zinc chloride in 50 ml of acetone was added dropwise with stirring, and the resultant mixture was stirred further for 3 hours at room temperature. Then the mixture was concentrated under reduced pressure, and isopropyl ether was added to the residue and stirred. The resulting colorless precipitate was collected by filtration, whereby 31 g of cyclohexanone oxime-zinc chloride complex were obtained. The yield was 57 percent. The recrystallization product of the precipitate from isopropyl ether had a melting point of 90° – 91° C., and elemental analytical values of: C: 39.87 %, H: 6.40 %, and Cl: 19.38 %. The values corresponded well to the calculated values of cyclohexanone oxime-zinc chloride complex in a mole ratio of 2 : 1 ($C_{12}H_{22}N_2O_2 \cdot ZnCl_2$), which are C: 39.75 %, H: 6.12 %, and Cl: 19.55 %.

EXAMPLE 8

To a solution of 8.1 g (72 m moles) of cyclohexanone oxime in 20 ml of diethyl ether, a solution of 10.5 g (74 m moles) of boron trifluoridediethyl ether complex in 20 ml of diethyl ether was added dropwise with stirring. Several minutes after the addition, crystalline precipitate began to form, which was filtered after 2 additional hours' stirring. Thus 11.5 g of cyclohexanone oxime-boron trifluoride complex were obtained. The yield was 89 percent. The complex had a melting point of 55° – 60° C., (on hot plate), and a nitrogen analysis value of N: 7.91 %, which corresponded well to the calculated value of cyclohexanone oxime-boron trifluoride complex in a mole ratio of 1 : 1 ($C_6H_{11}NO \cdot BF_3$), that is N: 7.74 %.

EXAMPLE 9

11.65 grams (52 m moles) of zirconium tetrachloride were dissolved in 150 ml of tetrahydrofuran under cooling with cryogen. A minor quantity of impurities was removed by filtration, and the tetrahydrofuran solution was added dropwise to a solution of 11.3 g (100 m moles) of cyclohexanone oxime in 30 ml of ethylene chloride. During the addition, colorless crystals began to precipitate. After the addition the mixture was further stirred for 30 minutes, and the crystalline precipitate was collected by filtration. Thus 19.7 g of cyclohexanone oxime-zirconium tetrachloride complex were obtained, which had a melting point of 167° – 168° C., and chloride analytical value of Cl: 28.8 %. This corresponded well to the calculated chlorine content of cyclohexanone oxime-zirconium tetrachloride complex in a mole ratio of 2 : 1 ($C_{12}H_{222}O_2 \cdot ZrCl_4$), which is Cl: 30.8 %.

Examples 10 through 26 concern the preparation of complexes of lactam with halides which are Lewis acids.

EXAMPLE 10

To a solution of 48 m moles of ε-caprolactim-O-sulfonic acid in 80 ml of ethylene chloride, 11.7 g (48 m moles) of cyclohexanone oxime-stannic chloride complex were added with stirring at room temperature. Soon after the addition of said cyclohexanone oxime-stannic chloride complex, the temperature of the system rose above room temperature by 2° – 3° C., and a homogeneous solution was formed approximately 20 minutes thereafter. The stirring was continued for approximately 90 minutes after the addition of specified complex, at which time the temperature began to fall. Simultaneously the solution began to become turbid, and a precipitate formed gradually. After standing overnight at room temperature, the mixture was filtered to separate the precipitate from the filtrate. The colorless precipitate was ε-caprolactam-stannic chloride complex. The yield was 7.6 g. (The yield based on the used oxime complex was 65 percent.)

The filtrate was concentrated under reduced pressure. The residue was dissolved in water, neutralized with ammonia, and extracted with chloroform to afford 6.5 g of ε-caprolactam.

From subtraction of the theoretical yield 5.4 g (48 m moles) of ε-caprolactam originating from the ε-caprolactim-O-sulfonic acid employed from the experimental yield, it was seen that the lactam complex contained in the filtrate was at least 9.7 m moles (2.37 g).

From the above result, it is clear that at least 85 percent of the oxime complex was converted to the lactam complex.

EXAMPLE 11

To a solution of 48 m moles of ε-caprolactim-O-sulfonic acid in 80 ml of ethylene chloride, 11.7 g (48 m moles) of cyclohexanone oxime-stannic chloride complex were added with stirring at room temperature. The temperature of the mixture whereupon rose above room temperature by 2° – 3° C., and the mixture became a homogeneous solution after approximately 20 minutes. Ninety minutes after addition of the complex, the temperature began to fall. Then 11.7 g (48 m moles) of the oxime complex were again added to the mixture and the stirring was continued. The temperature of reaction mixture rose again by 2° – 3° C. above room temperature. The suspension-like reaction mixture was stirred overnight.

The reaction mixture was filtered, and 20.8 g of colorless, solid ε-caprolactam-stannic chloride complex were obtained. The product yield based upon the added oxime complex was 89 percent.

The filtrate was treated similarly to Example 10, and 5.6 g of ε-caprolactam were obtained.

From the calculation made in the same manner as in Example 10, it is apparent that at least 92 percent of the oxime complex was converted to the lactam complex.

EXAMPLE 12

To a solution of 48 m moles of ε-caprolactim-O-sulfonic acid in 70 ml of ethylene chloride, 23.4 g (96 m moles) of cyclohexanone oxime-stannic chloride complex were added at room temperature, with stirring. Soon the temperature of the mixture rose above room temperature by 2° – 3° C.

After approximately 4 hours' stirring, the temperature began to fall. The mixture was allowed to stand overnight at room temperature, and then filtered to give 21.0 g of ε-caprolactam-stannic chloride complex. The yield based upon the added oxime complex was 90 percent.

The filtrate was treated similarly to Example 10, and 5.5 g of ε-caprolactam were obtained.

From the calculation made in the same manner as in Example 10, it is apparent that at least 92 percent of the oxime complex was converted to the lactam complex.

EXAMPLE 13

To a solution of ε-caprolactim-O-sulfonic acid (48 m moles) and stannic chloride (24 m moles) in ethylene chloride (100 ml), 35.1 g (144 m moles) of crystalline cyclohexanone oxime-stannic chloride complex were added with stirring at 30° C. The temperature of the mixture there upon rose, at the highest to 79.5° C. Thus obtained colorless, clear solution was stirred at room temperature. With the fall in the temperature, the crystalline precipitate was gradually formed. After 13.5 hours from the initial addition of the oxime complex, 5.4 g (48 m moles) of crystalline ε-caprolactam were added to the mixture, and 3 hours thereafter the precipitated crystal was collected by filtration. Thus 38.3 g of ε-caprolactam-stannic chloride complex were obtained. When 11.7 g (48 m moles) of the complex originating from the lactam applied after the reaction were subtracted from 38.3 g of the resulting complex, it was found that the quantity of the lactam complex obtained by the rearrangement of the oxime complex was 26.7 g.

By treating the filtrate similarly to Example 10, 5.5 g of ε-caprolactam were obtained.

From the above result, it is clear that at least 76 percent of the oxime complex was converted to the lactam complex.

EXAMPLE 14

A solution of ε-caprolactim-O-sulfonic acid (48 m moles) and stannic chloride (24 m moles) in ethylene chloride (100 ml) was first heated to 65° C. When the temperature fell to 60° C, 8.77 g (36 m moles) of cyclohexanone oxime-stannic chloride complex were added to the mixture. The oxime complex was dissolved simultaneously with the addition, and the temperature of the reaction mixture rose, at the highest to 76.5° C. Thereafter the temperature fell to 60° C. at 7 minutes after the addition of the oxime complex. By external heating, the temperature was maintained at 60° C. for additional 3 minutes. That is, the reaction at 60° C. or above was continued for 10 minutes. Then 8.77 g (36 m moles) of the oxime complex were added again to the reaction mixture, and the resultant mixture was treated in a manner similar to that following the first addition. Such reaction was further repeated twice. The highest temperatures reached at each addition of the oxime complex were, respectively, 73° C. after the second addition, 71° C. after the 3rd addition, and 69° C. after the 4th addition. Four hours after the last addition of oxime complex, 5.4 g of ε-caprolactam (48 m moles) were added, and the reaction mixture was stirred for 8 hours and then allowed to stand overnight. Then the crystalline precipitate was collected by filtration. Thus 40.4 g of ε-caprolactam-stannic chloride complex were obtained. Subtracting therefrom 11.7 g (48 m moles) originating from the ε-caprolactam added after the reaction, the yield of the lactam complex based on the rearrangement of the oxime complex was 28.8 g.

By treating the filtrate similarly to Example 10, 6.3 g of ε-caprolactam were obtained. From this result, it is clear that at least 88 percent of the oxime complex was converted to the lactam complex.

EXAMPLE 15

To a solution of ε-caprolactim-O-sulfonic acid (48 m moles) and stannic chloride (24 m moles) in ethylene chloride (200 ml), 70.2 g (288 m moles) of cyclohexanone oxime-stannic chloride complex were added at 70° C., in eight portions at 10-minute intervals, similarly to Example 14. The highest temperatures attained due to the exothermic reaction caused by additions of the oxime complex were: 78° C. after the first addition, and thereafter, respectively, 76°, 76°, 75°, 74°, 73.5°, 74°, and 74° C. Four hours after the last addition of oxime complex, 5.4 g (48 m moles) of ε-caprolactam were added, and the mixture was stirred for 20 hours at room temperature. Then the crystalline precipitate was collected by filtration. Thus 68.2 g of ε-caprolactam-stannic chloride complex were obtained.

Subtracting therefrom 11.7 g (48 m moles) originating from the lactam added after the reaction, the yield of the lactam complex based on the rearrangement of the oxime complex was 56.6 g.

The filtrate was treated similarly to Example 10, and 6.9 g of ε-caprolactam were obtained. This result indicates that at least 87 percent of the oxime complex was converted to the lactam complex.

EXAMPLE 16

To a solution of ε-caprolactim-O-sulfonic acid (48 m moles), stannic chloride (24 m moles) and ethylene glycol dimethyl ether (1.26 g, 14 m moles) in ethylene chloride (100 ml), 35.1 g (144 m moles) of cyclohexanone oxime-stannic chloride complex were added in four portions, at 10-minute intervals similarly to Example 14. After each addition of cyclohexanone oxime-stannic chloride complex, exothermic phenomenon was observed, each highest temperatures being, respectively, 77°, 73°, 72°, and 71° C. After the last addition of the oxime complex, the mixture was stirred at room temperature for 3 hours, then cooled and stirred at 10° C. or below for 30 minutes. The precipitate was collected by filtration. Thus 29.5 g (84 percent) of ε-caprolactam-stannic chloride complex were obtained.

EXAMPLE 17

To a solution of ε-caprolactim-O-sulfonic acid (48 m moles), stannic chloride (9.38 g, 36 m moles), and ethylene glycol dimethyl ether (3.24 g, 36 m moles) in ethylene chloride (100 ml), 35.1 g (144 m moles) of cyclohexanone oxime-stannic chloride complex were added in four portions at 60° C., with stirring. After the addition of a first 8.8 g portion of the complex the temperature of the reaction mixture rose, at the highest to 75° C. Soon the temperature began to fall, and therefore the mixture was maintained at lowest 60° C. for 10 minutes from the addition of the oxime complex, by external heating. After 10 minutes, a second 8.8 g portion of the oxime complex was again added. The temperature rose, at the highest to 74° C. Similarly, the temperature of reaction mixture rose to 71° C. after the third addition, and to 69° C. after the fourth addition. The fourth addition was followed by 8 hours' stirring at room temperature and 12 hours' standing. Thereafter 28.9 g (83 percent) of ε-caprolactam-stannic chloride complex formed as crystalline precipitate were collected by filtration.

EXAMPLE 18

To a solution of ε-caprolactim-O-sulfonic acid (48 m moles), stannic chloride (9.38 g, 36 m moles) and diethylene glycol dimethyl ether (16.4 g, 48 m moles) in ethylene chloride (100 ml), 35.1 g of cyclohexanone oxime-stannic chloride complex (144 m moles) were added in 4 portions, at 10-minute intervals, at 60° C. with stirring, similarly to Example 14. The highest temperatures of the reaction mixture attained by the exothermic phenomenon were, respectively, 73°, 68°, 67°, and 64° C. The last addition was followed by 8 hours' stirring at room temperature, and 12 hours' standing. Collecting the precipitate by filtration, 28.3 g (81 percent) of pure ε-caprolactam-stannic chloride complex were obtained.

EXAMPLE 19

To a solution of ε-caprolactim-O-sulfonic acid (48 m moles), 9.38 g (36 m moles) of stannic chloride, and 3.22 g (24 m moles) of diethylene glycol dimethyl ether in ethylene chloride (100 ml), 35.1 g (144 m moles) of cyclohexanone oxime-stannic chloride complex were added in four portions, at 10-minute intervals at 60° C. with stirring. Thus the rearrangement reaction was performed similarly to Example 14. The highest temperatures of the reaction mixture resulting from the exothermic phenomenon caused by the oxime complex addition were, respectively, 75°, 72°, 70°, and 69° C. Then the mixture was stirred for 8 hours at room temperature, and allowed to stand for 12 hours. Collecting the precipitate by filtration, 27.6 g. (79 percent) of ε-caprolactam-stannic chloride complex were obtained.

EXAMPLE 20

To a solution of ε-caprolactim-O-sulfonic acid (48 m moles) and stannic chloride (24 m moles) in ethylene chloride (100 ml), 8.77 g (36 m moles) of cyclohexanone oxime-stannic chloride complex were added at 60° C. Due to the exothermic reaction, the temperature of the reaction mixture rose to, at the highest, 76.5° C. Soon the temperature began to fall, so that the mixture was externally heated to be maintained at the lowest 60° C, for 10 minutes. Then 8.77 g (36 m moles) of the oxime complex were added, and the resultant mixture was treated in a manner similar to that following the first addition. The reaction was further repeated twice. The highest temperatures attained for the second through fourth additions were, respectively, 72.5°, 72.2°, and 71° C. Ten minutes after the fourth addition, the reaction mixture was heated for 30 minutes under reflux, stirred for 8 hours at room temperature and allowed to stand overnight. Collecting the precipitate by filtration, 26.15 g of ε-caprolactam-stannic chloride complex were obtained, which corresponds to 75 percent of theoretical yield, i.e., 35.1 g.

EXAMPLE 21

To a solution of ε-caprolactim-O-sulfonic acid (48 m moles) in ethylene chloride (80 ml), 11.0 g. (48 m moles) of cyclohexanone oxime-zirconium tetrachloride complex were added at room temperature, with stirring. The temperature of the system rose by approximately 20° C. due to the exothermic reaction, and the temperature of the reaction mixture became 44° C. Soon the temperature began to fall gradually, and returned to room temperature after 50 minutes. The mixture was further stirred for 15 hours at room temperature, and the suspended crystals were collected by filtration. The product was identified by I. R. spectrum with ε-caprolactam-zirconium tetrachloride complex synthesized by different means. Thus 4.5 g of the complex were obtained, corresponding to a yield of 41 percent. To the mother liquor separated from the crystals, water was added, and the aqueous mixture was neutralized with ammonia. Then 200 ml of methanol were added to the mixture, the insoluble component was removed by filtration, and the filtrate was concentrated under reduced pressure. To the residue remaining after removal of ethylene chloride and methanol, 50 ml of water were added to form a solution, which was extracted five times with each 50 ml of chloroform. The combined chloroform extracts were dried over anhydrous sodium sulfate and concentrated under reduced pressure to yield 7.3 g of ε-caprolactam.

EXAMPLE 22

To a solution of ε-caprolactim-O-sulfonic acid (48 m moles) in ethylene chloride (80 ml), 11 g (48 m moles) of cylohexanone oxime-zirconium tetrachloride complex were added at room temperature with stirring. A temperature rise by approximately 20° C., due to the exothermic reaction, was observed, and the temperature of the mixture became 46° C., which however soon began to fall. The stirring was continued, and the temperature of the reaction mixture returned to room temperature after 70 minutes. Then 11 g (48 m moles) of cyclohexanone oxime-zirconium tetrachloride complex were again added. The temperature again rose to 36° C. 20 minutes after the addition, and returned to room temperature within approximately an hour thereafter. After overnight stirring, the suspended crystals were collected by filtration. Thus 15.8 g of ε-caprolactam-zirconium tetrachloride complex were obtained. The yield of 72 percent. The mother liquor was treated similarly to Example 21, yielding 5.9 g ε-caprolactam.

EXAMPLE 23

To a solution of ε-caprolactim-O-sulfonic acid (48 m moles) in ethylene chloride (100 ml), 15.95 g (48 m moles) of cyclohexanone oxime-stannic bromide complex were added at 26° C. The temperature rose to 36° C. 20 minutes after the addition. The reaction mixture was stirred for an additional 4.5 hours at room temperature, then again heated to 50° C., and allowed to cool off. The mixture was concentrated under reduced pressure. The residue was chromatographed on silica gel column. Elution with ethylene chloride followed by concentration of the eluate gave 11.6 g of a mixture of crystals with an oily substance. The crystal was separated by filtration after addition of ethyl acetate to the mixture. The yield was 8.2 g. From the filtrate, further 2.5 g of crystals were obtained. Both crystals were identified with ε-caprolactam-stannic bromide complex synthesized in a different manner, by means of I. R. spectrum. The total yield was 67 percent.

EXAMPLE 24

To a solution of ε-caprolactim-O-sulfonic acid (48 m moles) in ethylene chloride (100 ml), 31.9 g (96 m moles) of cyclohexanone oxime!-stannic bromide complex were added at 25° C. The temperature of reaction mixture rose to 30° C 60 minutes after the addition, due to the exothermic reaction. Immediately thereafter the mixture was heated to 55° C. Whereupon again exothermic phenomenon was observed, raising the temperature to 74° C. The suspended crystals disappeared, and a homogeneous solution was formed. The stirring was continued at room temperature, and crystals again began to form 50 minutes thereafter. After one night's standing at room temperature, the reaction mixture was concentrated, and the residue was chromatographed on silica gel column. Elution with ethylene chloride followed by concentration of the eluate gave 33.6 g of a mixture of crystals with an oily substance. Adding ethyl acetate thereto, the crystals were separated by filtration. The yield was 21.55 g. Further 3.1 g of crystals were recovered from the filtrate. Both crystals were identified by I. R. spectrum with ε-caprolactam-stannic bromide complex synthesized by a different method. The yield was 77 percent.

EXAMPLE 25

To a solution of zirconium tetrachloride (50 m mols) in ethylene chloride (100 ml), 11.3 g (100 m moles) of lactam were added at room temperature with stirring. The temperature of the mixture rose from 25° to 46° C., and the reaction liquid became opaque. After one night's stirring at room temperature, the reaction mixture was refluxed for an hour. The mixture was allowed to cool off, and the precipitate was separated by filtration. The yield was 21.54 g. The elemental analytical values of the product were as follows: N: 6.49 % and Cl: 29.07 %. The melting point was 238.5° – 242.5° C. (from MeOH). The analytical values correspond well to those of ε-caprolactam-zirconium tetrachloride complex in a mole ratio of 2 : 1 ($C_{12}H_{22}N_2O_2 \cdot ZrCl_4$), which are N: 6.10 %, and Cl: 30.87 %. The yield was 94 percent.

EXAMPLE 26

To a solution containing 4.52 g. (40 m moles) of ε-caprolactam in 20 ml of ethylene chloride, a solution of 8.77 g (20 m moles) of stannic bromide in 20 ml of ethylene chloride was added with stirring. In the meantime the mixture was externally cooled to −5° C., or below, and after the addition the temperature was gradually raised to room temperature, during which the stirring was continued. After an hour's stirring at room temperature, colorless precipitate formed as collected by filtration. The yield was 3.80 g, and elemental analytical values of the product were: C: 21.51 %, H: 3.16 %, N: 4.09 %, and Br: 48.07 %. The melting point was 141°– 142° C. The values corresponded well to the calculated values of ε-caprolactam-stannic bromide complex in a mole ratio of 2 : 1 ($C_{12}H_{22}N_2O_2 \cdot SnBr_4$), which are C: 21.67 %, H: 3.31 %, N: 4.21 %, and Br: 48.11 %.

The filtrate was concentrated under reduced pressure, and 10 ml of benzene were added to the residue and allowed to stand to cause precipitation of insoluble component. Filtering the mixture, 8.60 g of light yellow ε-caprolactam-stannic bromide complex were obtained. The total yield was 12.40 g, i.e., 93 percent.

Examples 27 through 32 demonstrate that the rearrangement reaction of oxime-O-sulfonic acid is facilitated by halides which are Lewis acids.

EXAMPLE 27

To a suspension of cyclohexanone oxime-O-sulfonic acid (48 m moles) in ethylene chloride (100 ml), 11.0 g (48 m moles) of ε-caprolactam-zirconium tetrachloride complex were added at −6° C., under cooling with cryogen, and the resultant mixture was stirred for 5 minutes at −5° C. Then the external cooling was stopped. The temperature of the reaction mixture rose gradually to exceed room temperature. At 30° C. the temperature rise became abrupt, to reach as high as 41° C. During the following 1.5 hours' stirring, the temperature fell gradually to room temperature. Again the mixture was cooled to −10° C. or below, ice water added, and then the mixture neutralized with aqueous ammonia. After addition of 200 ml of methanol thereto, insoluble matter was filtered off, and the filtrate was concentrated under reduced pressure. The residue was dissolved in 50 ml of water, and extracted with chloroform (60 ml × 5). The extract was dried over anhydrous sodium sulfate and concentrated under reduced pressure. Thus 9.7 g of ε-caprolactam were obtained. This result indicates that the oxime-O-sulfonic acid is exothermically rearranged in the presence of ε-caprolactam-zirconium tetrachloride complex, without any trouble.

EXAMPLE 28

To a suspension of cyclohexanone oxime-O-sulfonic acid (48 m moles) in ethylene chloride (75 ml), a solution of 8.68 g (48 m moles) of ε-caprolactam-boron trifluoride complex in 40 ml of ethylene chloride was added dropwise, under cooling and stirring. In the meantime, the mixture was maintained at −8° to −2° C. The cooling was stopped to allow the temperature of the mixture to return gradually to room temperature, and then the mixture was heated. When the temperature reached 55° C., an abrupt exothermic phenomenon was observed, raising the temperature of the reaction mixture to 65° C. After subsequent stirring for 2 hours at room temperature, the mixture was concentrated under reduced pressure, and the residue was dissolved in water, neutralized with aqueous ammonia, and extracted with chloroform (50 ml × 5). The extract was dried and concentrated, providing 10.2 g of ε-caprolactam. This result indicates that, in the presence of ε-caprolactam-boron trifluoride complex, the oxime-O-sulfonic acid is smoothly rearranged.

EXAMPLE 29

To a suspension of cyclohexanone oxime-O-sulfonic acid (48 m moles) in ethylene chloride (100 ml), 5.6 g (24 m moles) of zirconium tetrachloride as finely divided solid were added at −7° C. with stirring. Upon the addition the temperature of the reaction mixture rose from −7° to +7° C. Stopping the external cooling, the mixture was stirred at room temperature. Within approximately 40 minutes the temperature of the mixture returned to room temperature (22° C). Immediately the mixture was cooled to −10° C. or below, ice water added, the mixture neutralized with aqueous ammonia, and 200 ml of methanol added. The insoluble component was removed by filtration. The filtrate was concentrated under reduced pressure, and the residue was dissolved in 50 ml of water and extracted with chloroform (50 ml × 5). The extract was dried and concentrated, to give 4.5 g of ε-caprolactam. This result indicates that at least 83 percent of the oxime-O-sulfonic acid was rearranged under the specified reaction conditions.

EXAMPLE 30

To a suspension of cyclohexanone oxime-O-sulfonic acid (48 m moles) in ethylene chloride (100 ml), a solution of 14.35 g (24 m moles) of antimony pentachloride in 20 ml of ethylene chloride was added dropwise, under cooling with cryogen and stirring. The addition was completed within approximately 10 minutes, during which the temperature of the reaction mixture was maintained at −6° to −2° C. Five minutes thereafter, the external cooling was stopped, and the stirring was continued at room temperature for several minutes. Whereupon the temperature rose exothermically to 27° C. within 2 minutes. After subsequent stirring for an hour at room temperature, the mixture was again cooled. Water was added to the mixture at 5° C. or below, and then the mixture was neutralized with aqueous ammonia. Ethylene chloride was removed under reduced pressure. The water-insoluble component was removed by filtration, and the remaining aqueous solution was extracted with chloroform (50 ml × 5). The extract was dried and concentrated, to give 4.8 g of ε-caprolactam. Thus, at least 88 percent of the oxime-O-sulfonic acid was rearranged under the specific reaction conditions.

EXAMPLE 31

To a suspension of cyclohexanone oxime-O-sulfonic acid (48 m moles) in ethylene chloride (80 ml), 3.2 g (24 m moles) of solid aluminum chloride were added at −7° C. Then the external cooling was stopped. Within approximately 30 minutes thereafter, the temperature of the mixture returned to room temperature. After 25 minutes' stirring at room temperature, again the mixture was cooled. To the mixture, 20 ml of ice water and then aqueous ammonia were added, during which the temperature was maintained at −5° C. or below.

Ethylene chloride was removed under reduced pressure, and the residue was dissolved in 200 ml of ethanol. The insoluble component was removed by filtration, and the filtrate was concentrated under reduced pressure. The residue was dissolved in 30 ml of water and extracted with chloroform (50 ml × 6). From the extract, 4.4 g of ε-caprolactam were obtained. This indicates that at least 82 percent of the oxime-O-sul-

EXAMPLE 32

To a suspension of sulfur trioxide-dioxane (1 : 1) adduct (48 m moles) in ethylene chloride (50 ml), a solution of 8.7 g (48 m moles) of cyclohexanone oxime-zinc chloride complex in 20 ml of ethylene chloride was added dropwise under cooling and stirring over a period of 15 minutes. In the meantime the reaction mixture was maintained at −10° − 0° C. After the addition, the external cooling was stopped. The stirring was continued, and the temperature of the reaction mixture returned to room temperature in approximately 40 minutes. After subsequent 2.2 hours' stirring at room temperature, the mixture was again cooled, and water and aqueous ammonia were added thereto in the order stated, at 0° C. or below. After removal of ethylene chloride, the resulting aqueous solution was extracted with chloroform (50 ml × 5). The extract was dried and concentrated to yield 4.65 g of ε-caprolactam. This indicates that at least 86 percent of the oxime-O-sulfonic acid was rearranged under the specified conditions.

Example 33 shows the reaction route of the subject process.

EXAMPLE 33

To a solution of γ-methylcaprolactim-O-sulfonic acid (48 m moles) in ethylene chloride (80 ml), 11.7 g (48 m moles) of cyclohexanone oxime-stannic chloride complex were added at −10° C., with stirring. Presently the temperature of the mixture rose to −3° C. The resulting suspension was stirred at 5° C. for approximately 1.5 hours, whereupon it became a clear solution. The solution was cooled to −10° C., to which 50 ml of chloroform containing 6.5 g of imidazole were added dropwise. The stirring was continued, while the temperature of the mixture was allowed to slowly return to room temperature. The colorless solid precipitated after the imidazole addition changed to an oily matter as the temperature rose. After 30 minutes' stirring at room temperature, the mixture was concentrated to remove ethylene chloride and chloroform which served as solvents. To the oily residue, 100 ml of tetrahydrofuran was added, and the precipitated colorless solid was collected by filtration. The precipitate was a mixture of imidazole salt of cyclohexanone oxime-O-sulfonic acid and imidazole-stannic chloride complex, and was hydroscopic. The solid was suspended in 60 ml of acetonitrile and stirred, to dissolve the imidazole salt of cyclohexanone oxime-O-sulfonic acid in acetonitrile, and the insoluble imidazole-stannic chloride complex was separated by filtration. The filtered cake weighed 5.8 g. Acetonitrile was removed from the filtrate by concentration under reduced pressure. Thus 7.8 g of solid imidazole salt of cyclohexanone oxime-O-sulfonic acid were obtained. The yield based upon the added oxime complex was 62 percent.

The filtrate containing tetrahydrofuran from which the colorless solid had been separated was concentrated under reduced pressure to remove the tetrahydrofuran. To the residue, 50 ml of water and aqueous ammonia were added in the order stated, and the precipitate was removed by filtration. By chloroform extraction of the aqueous filtrate, 5.3 g of γ-methylcaprolactam were obtained. The yield to the employed γ-methylcaprolactim-O-sulfonic acid was 87 percent.

From this result it is clear that at least 87 percent of the γ-methylcaprolactim-O-sulfonic acid employed was converted to γ-methylcaprolactam-stannic chloride complex.

With this Example 33, it is demonstrated that lactim-O-sulfonic acids react with complexes of alicyclic ketoximes with halides which are Lewis acids, and are converted to the corresponding complexes of lactams with the halides, and that simultaneously the alicyclic ketoximes are sulfonated to form alicyclic ketoxime-O-sulfonic acids as the reaction proceeds.

We claim:

1. A process for the preparation of lactams, which comprises reacting a lactim-O-sulfonic acid of the formula,

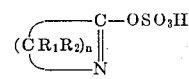

wherein $n$ is a number of 3 to 11, and $R_1$ and $R_2$ are each a hydrogen atom, an alkyl group or alkenyl group, with a complex of an alicyclic ketoxime of the formula,

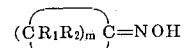

wherein $m$ is a number of 3 to 11, and $R_1$ and $R_2$ are each a hydrogen atom, an alkyl group or alkenyl group, with a halide of the formula, $MX_p$ wherein M is an element of Groups I-B, II-B, III-A, IV-A, IV-B, V-A or VIII of the Periodic Table, X is a halogen atom, and $p$ is a number equalling the valency of M, in the presence of an inert organic solvent, at a temperature of from −30° to 150° C., to form complex compounds of lactams of the formula,

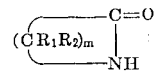

wherein $R_1$, $R_2$, and $m$ have the same meaning as defined above, with said halide, and recovering the formed complex of said lactam with said halide.

2. The process of claim 1 wherein said halide is present in the reaction system in a quantity not exceeding an amount equimolar to said lactim-O-sulfonic acid initially present in the reaction system.

3. The process of claim 2 wherein said complex of said alicyclic ketoxime with said halide is represented by the formula,

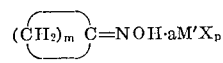

wherein $m$ is a number of 3 to 11, M' is tin, zirconium, boron, zinc, antimony or aluminum, X is a halogen atom, p is a number equalling the valency of M', and $a$ is ½ or 1.

4. A process for the preparation of lactams, which comprises adding to a reaction system comprising an inert organic solvent and lactim-O-sulfonic acid (a) of the formula,

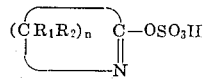

wherein $n$ is a number of 3 to 11, and $R_1$ and $R_2$ are each a hydrogen atom, an alkyl group or alkenyl group, dissolved therein a complex compound (b) of a ketoxime of the formula,

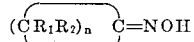

wherein $n$, $R_1$ and $R_2$ are as defined above, with a halide of the formula, $MX_p$ wherein M is an element of Groups I-B, II-B, III-A, IV-A, IV-B, V-A or VIII of the Periodic Table, X is a halogen atom, and $p$ is a number equalling the valency of M, at such a ratio that said complex (b) does not exceed 500 mol percent based on said lactim-O-sulfonic acid (a) in the reaction system, at a temperature ranging from 20° to 100° C., and recovering the formed complex of the corresponding lactam with said halide.

* * * * *

UNITED STATES PATENT OFFICE
CERTIFICATE OF CORRECTION

Patent No. 3,687,938             Dated August 29, 1972

Inventor(s) MITSUO MASAKI ET AL

It is certified that error appears in the above-identified patent and that said Letters Patent are hereby corrected as shown below:

Claim 1, Column 18, line 38, after "30°" insert --C.--

Claim 4, Column 20, line 7, after "20°" insert --C.--

Signed and sealed this 23rd day of January 1973.

(SEAL)
Attest:

EDWARD M. FLETCHER, JR.                ROBERT GOTTSCHOLK
Attesting Officer                      Commissioner of Patents